(12) United States Patent
Pistoia et al.

(10) Patent No.: US 10,095,490 B2
(45) Date of Patent: Oct. 9, 2018

(54) SYSTEM, METHOD AND APPARATUS FOR PREVENTING VULNERABLE INTERLEAVINGS IN WEB APPLICATIONS AT COMPILE TIME

(71) Applicant: International Business Machines Corporation, Armonk, NY (US)

(72) Inventors: Marco Pistoia, Amawalk, NY (US); Omer Tripp, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/222,460

(22) Filed: Jul. 28, 2016

(65) Prior Publication Data
US 2018/0032319 A1  Feb. 1, 2018

(51) Int. Cl.
*G06F 9/45* (2006.01)
*G06F 8/41* (2018.01)

(52) U.S. Cl.
CPC ............. *G06F 8/433* (2013.01); *G06F 8/41* (2013.01)

(58) Field of Classification Search
CPC ...................................................... G06F 8/433
USPC ......................................... 717/155; 707/155
See application file for complete search history.

(56) References Cited

U.S. PATENT DOCUMENTS

| 5,918,005 A | 6/1999 | Moreno et al. | |
|---|---|---|---|
| 6,539,543 B1 * | 3/2003 | Guffens | G06F 8/447 717/151 |
| 6,971,092 B1 * | 11/2005 | Chilimbi | G06F 11/3466 711/118 |
| 7,209,918 B2 | 4/2007 | Li | |
| 7,210,135 B2 * | 4/2007 | McCrady | G06F 8/433 717/140 |
| 7,278,136 B2 * | 10/2007 | Moritz | G06F 8/4432 711/170 |
| 8,392,898 B2 | 3/2013 | Pirvu | |
| 2008/0010414 A1 * | 1/2008 | Kailas | G06F 12/126 711/133 |
| 2010/0192131 A1 * | 7/2010 | Dolby | G06F 8/458 717/126 |
| 2013/0024942 A1 * | 1/2013 | Wiegenstein | G06F 11/3604 726/25 |

* cited by examiner

*Primary Examiner* — Evral E Bodden
(74) *Attorney, Agent, or Firm* — Scully, Scott, Murphy & Presser, P.C.; Daniel P. Morris, Esq.

(57) ABSTRACT

Systems, methods, and computer program products are disclosed including receiving a computer program, compiling the computer program, performing data flow analysis on the computer program to identify accesses to data locations by execution units at compile-time, generating a list of data-flow paths including accesses to one or more of the data locations, determining that more than one of the execution units accesses the same data location based on the list of data-flow paths, determining the existence of a potential vulnerability in at least one of the data-flow paths based at least in part on the determination that more than one of the execution units accesses the same data location, synthesizing a scheduling constraint for the data location based at least in part on the determination of the existence of the potential vulnerability in the at least one of the data-flow paths, and implementing the scheduling constraint for the data location.

20 Claims, 3 Drawing Sheets

SYSTEM, METHOD AND APPARATUS FOR PREVENTING VULNERABLE INTERLEAVINGS IN WEB APPLICATIONS AT COMPILE TIME

TECHNICAL FIELD

The present disclosure relates to systems, methods, and computer program products for preventing vulnerable interleavings in software applications.

BACKGROUND

Race conditions may occur when a device or system attempts to perform two or more operations at the same time but the operations must instead be performed in a proper sequence to execute correctly. Such race conditions may cause subtle functional bugs in multithreaded software systems. Race conditions may impact functional performance by allowing incorrect or corrupted data to be received or acted on by an unintended portion of the software system. Race conditions may also lead to security vulnerabilities.

BRIEF SUMMARY

The systems, apparatus, methods, and computer program products described herein provide the capability to prevent vulnerable interleavings related to race conditions in software applications. A vulnerable interleaving may occur during a race condition, for example, when a first operation and a second operation execute at the same time, the first operation alters or overwrites original data stored in a shared data location, and the second operation, expecting to read and use the original data that was stored in the shared data location, instead reads and uses the altered or overwritten data from the shared data location.

In an aspect of the present disclosure, a method is disclosed. The method includes receiving a computer program, compiling the computer program, at compile-time, performing data flow analysis on the computer program to identify accesses to data locations by execution units, generating a list of data-flow paths including accesses to one or more of the data locations based on the data flow analysis, determining that more than one of the execution units accesses the same data location based on the list of data-flow paths, determining the existence of a potential vulnerability in at least one of the data-flow paths based at least in part on the determination that more than one of the execution units accesses the same data location, synthesizing a scheduling constraint for the data location based at least in part on the determination of the existence of the potential vulnerability in the at least one of the data-flow paths, and implementing the scheduling constraint for the data location on the computer program.

In aspects of the present disclosure apparatus, systems, and computer program products in accordance with the above aspect may also be provided.

BRIEF DESCRIPTION OF THE DRAWINGS

The details of the present disclosure, both as to its structure and operation, can best be understood by referring to the accompanying drawings, in which like reference numbers and designations refer to like elements.

DETAILED DESCRIPTION

Figure 1:
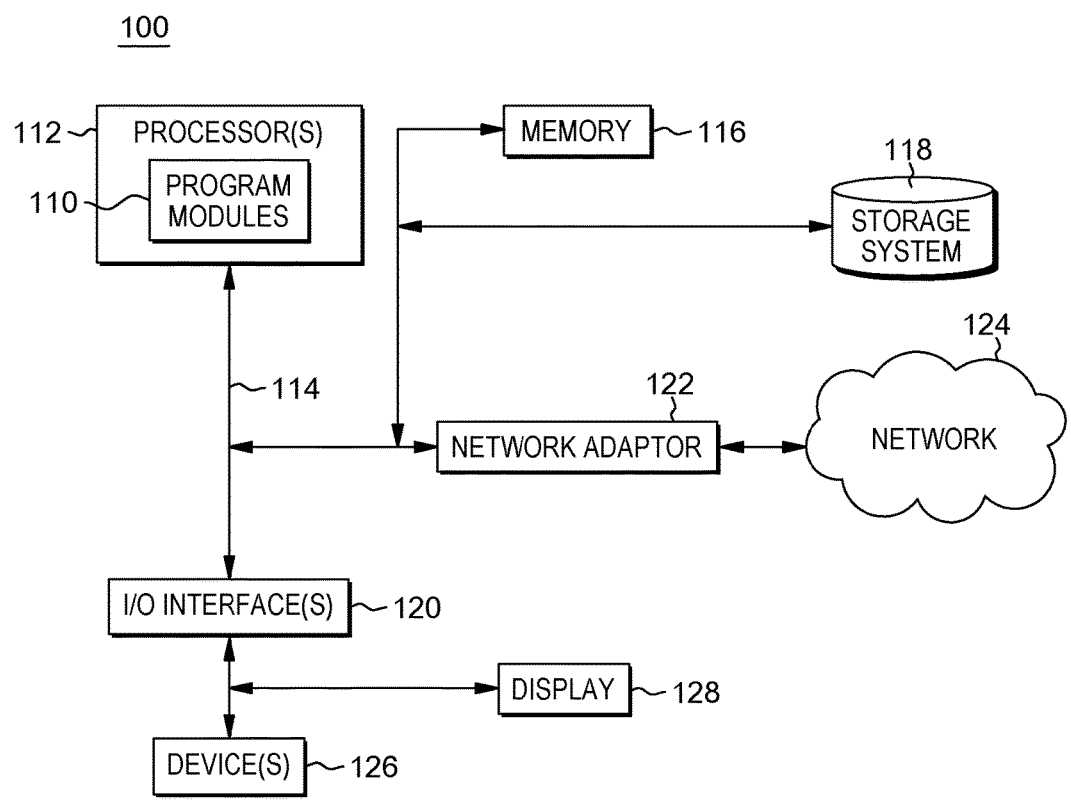
FIG. 1 is an exemplary block diagram of a computer system in which processes involved in the system, method, and computer program product described herein may be implemented.

The system, method, and computer program product described herein provide ways to prevent vulnerable interleavings in web or other applications. In one example, an interleaving in software may occur when operations having different priority execute at the same time. For example, on a single processor or thread of system or application, a low priority operation may be temporarily halted to allow for the execution of a high priority operation. An interleaving may also occur in a multithreading system where, for example, first and second operations may be performed at the same time using different threads. Such interleavings have the potential to cause race conditions when the operations share or manipulate one or more of the same data locations, attributes, variables, memory locations, hardware registers, or any other data storage location.

Race conditions related to interleavings may also impact the security of a system. For example, when one of the operations is a security critical operation, a race condition related to a particular data location may cause the security critical operation to receive, use, and/or propagate invalid, corrupt, or malicious data.

As an example, during an execution sequence, a low priority operation, e.g., an uncontrolled operation, may read the initial value of a data location, store the initial value of the data location in a temporary location (memory, ram, hardware registry, etc.), set the value of the data location to a new value, execute operations on the new value, and then return the value of the data location back to the initial value before completing execution.

In an interleaving, the low priority operation may be halted at any time during this process to give the high priority operation (e.g., a security critical operation) access to the system. For example, the low priority operation may be halted after changing the value of the data location but before returning the value of the data location back to the initial value. In the case where the high priority operation uses the data location as an input, a race condition may occur where the high priority operation now uses the altered value of the data location as an input. In other words, the data location has been corrupted due to the interleaving between the low priority operation and the high priority operation, thereby causing a race condition.

Such a race condition due to an interleaving may cause, for example, a functional component of the system to fail or act in a manner that is inconsistent with the functional components purpose. For example, a mission critical component may malfunction or fail due to a race condition. Such a race condition due to an interleaving may also potentially lead to security vulnerabilities. For example, an attacker may be able to insert malicious code into a system through the use of an interleaving associated race condition by storing the malicious code in the data location using the low priority operation, e.g., an operation with low security requirements, with the understanding that eventually the high priority operation, e.g., a security related operation or an operation with a high security access level, will read the malicious code from the data location during an interleaving, use the malicious code in security operations, propagate the malicious code throughout the rest of the system, send the malicious code to security critical locations, activate the malicious code, and/or allow the malicious code to access restricted portions of the system.

One issue with detecting and avoiding data races is that they often manifest only in specific thread interleavings. The issue is aggravated in cases where the race is not only a functional problem, but also a security risk. The following snippet of code provides an example where such an interleaving between two servlets in a web application may potentially make parallel access to the same data location thereby creating a security vulnerability:

```
Servlet A {
    Public void doGet(Request req, Response resp) {
        Session session = req.getSession( );
        String userPrefs = session.getAttribute("uprefs");
        if (userPrefs == null) {
            String uname = req.getParameter("name");
            userPrefs = readUserPrefsFromDB(uname); // Source }
        userPrefs = sanitize(userPrefs); // Sanitizer
        session.setAttribute("uprefs", userPrefs); }
        ...
        String uprefs = session.getAttribute("prefs");
        ...
        resp.getWriter( ).write("Your recorded preferences: " +
        uprefs); // Sink }
}
Servlet B {
    Public void doGet(Request req, Response resp) {
        Session session = req.getSession( );
        String userPrefs = session.getAttribute("uprefs");
        if (userPrefs == null) {
            String uname = req.getParameter("name");
            userPrefs = readUserPrefsFromDB(uname); // Source }
        session.setAttribute("uprefs", userPrefs); }
    ... }
}
```

In the above snippet, both servlets A and B manipulate the same session attribute, "uprefs". This introduces the potential for race condition using the attribute "uprefs" when "uprefs" is not initially set. The situation is complicated by the fact that servlet B neglects to sanitize the value it reads from the database into variable "userPrefs" before inserting it into the session attribute. For example, servlet B may neglect to execute a malicious code scan on the value and remove any potential malicious code before inserting the value into the session attribute. The failure to sanitize the value may introduce the following vulnerable interleaving sequence:

1. Servlet A finds that "uprefs" is not in the session.
2. Servlet A then reads the value of "uprefs" from the database and sanitizes it.
3. Servlet B checks for "uprefs", and also finds that it's not in the database.
4. Servlet A inserts the sanitized "uprefs" into the session object.
5. Servlet B inserts the un-sanitized "uprefs" into the session object, thereby overwriting servlet A's sanitized value with an un-sanitized value.
6. Servlet A reads "uprefs" from the session, and—assuming that it's sanitized—uses the read value in a security-sensitive operation.

By unknowingly using the un-sanitized value, servlet A may introduce vulnerability into the system. The present disclosure provides ways to prevent vulnerabilities due to interleaved race conditions from being introduced into the system.

FIG. 1 illustrates a schematic of an example computer or processing system 100 that may implement such a system in one embodiment of the present disclosure. The computer system 100 is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 1 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 100 may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system 100 may include, but are not limited to, one or more processors or processing units 112, a system memory 116, and a bus 114 that couples various system components including system memory 116 to processor 112. The processor 112 may include one or more program modules 110 that perform the methods described herein. The program modules 110 may be programmed into the integrated circuits of the processor 112, or loaded from memory 116, storage device 118, or network 124 or combinations thereof.

Bus 114 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 100 may include a variety of computer system readable media. Such media may be any available media that is accessible by computer system, and it may include both volatile and non-volatile media, removable and non-removable media.

System memory 116 can include computer system readable media in the form of volatile memory, such as random access memory (RAM) and/or cache memory or others. Computer system 100 may further include other removable/non-removable, volatile/non-volatile computer system storage media. By way of example only, storage system 118 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 114 by one or more data media interfaces.

Computer system 100 may also communicate with one or more external devices 126 such as a keyboard, a pointing device, a display 128, etc.; one or more devices that enable a user to interact with computer system 100; and/or any devices (e.g., network card, modem, etc.) that enable computer system to communicate with one or more other computing devices. Such communication can occur via Input/Output (I/O) interfaces 120.

Still yet, computer system 100 can communicate with one or more networks 124 such as a local area network (LAN), a general wide area network (WAN), and/or a public network (e.g., the Internet) via network adapter 122. As depicted, network adapter 122 communicates with the other components of computer system via bus 114. It should be understood that although not shown, other hardware and/or software components could be used in conjunction with computer system 100. Examples include, but are not limited to: microcode, device drivers, redundant processing units, external disk drive arrays, RAID systems, tape drives, and data archival storage systems, etc.

Figure 2:
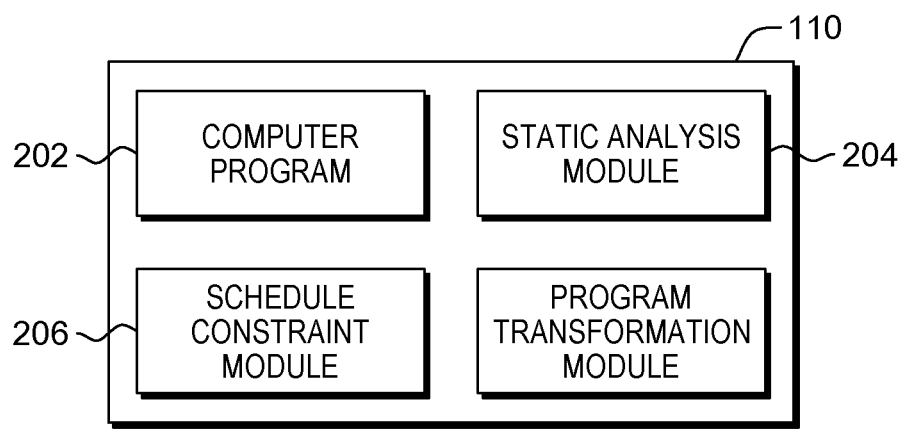
FIG. 2 is exemplary block diagram of functional components of the system according to an embodiment of the present disclosure.

System 100 may be configured to automatically implement one or more program modules 110 including a computer program 202, a static analysis module 204, schedule constraint module 206, and program transformation module 208, as illustrated, for example, by FIG. 2. A method 300 of preventing vulnerable interleavings is illustrated in FIG. 3.

Figure 3:
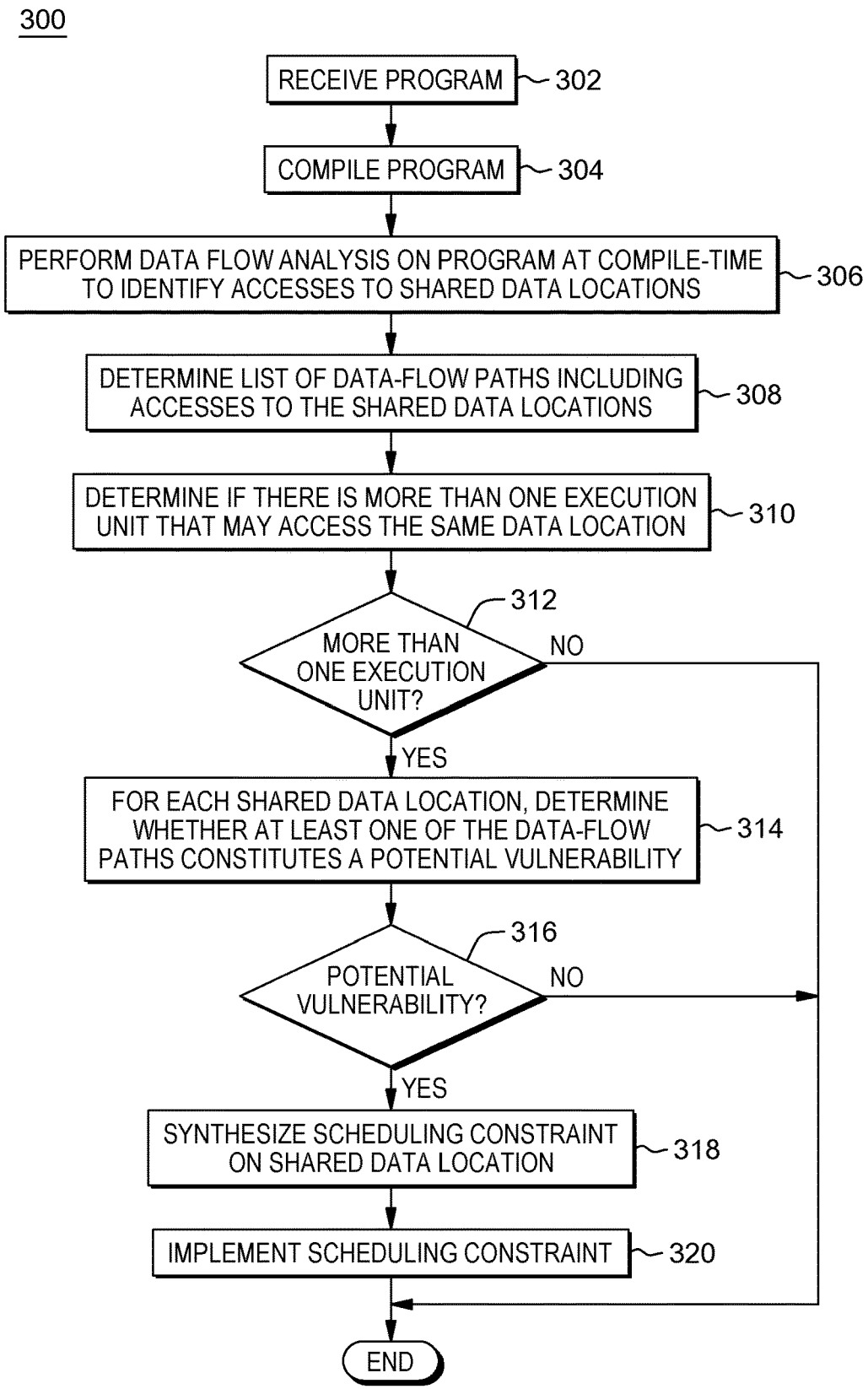
FIG. 3 is a flow chart of a method according to an embodiment of the present disclosure.

With reference now to FIGS. 2 and 3, at 302, computer program 202 is received. For example, the computer program 202 may be received from a user device, may be installed on a device of system 100, may be used to access a web server of system 100, etc. Computer program 202 may be any computer program that may include vulnerability to interleavings. In non-limiting examples, computer program 202 may include applications on a mobile device, web browsers, computer programs, or any other program that is executable by system 100 or by another device. In some embodiments, computer program 202 may be executed on a web server. In some embodiments, computer program 202 may be configured to receive inputs from system 100, wired or wirelessly from another source, via the internet, or in any other manner, and may be configure to perform one or more functions based on the inputs. In some embodiments, computer program 202 may include security features that are configured to prevent or protect a device from malicious code or access, e.g., malware.

At 304, system 100 compiles computer program 202. The computer program 202 may be compiled using any commercial or free-ware compiler. At 306 static analysis module 204 performs data flow analysis on computer program 202 at compile-time to identify any accesses to a data location.

Static analysis module 204 is configured to perform data flow analysis on computer program 202 to determine if computer program 202, alone or in conjunction with other processes of system 100, includes any potential vulnerable interleavings. For example, static analysis module 204 may perform a data flow analysis on computer program 202 at compile-time to determine if any data locations, e.g., session objects, variables, database records, etc., may be accessed by multiple execution units (e.g., servlets). Static analysis module 204 may configure the data flow analysis to find any accesses to a data location, for example, any accesses to the session attribute "uprefs" in the above example. Static analysis module 204 may configure data flow analysis by setting data-flow seeds for the analysis. For example, a data-flow seed for the data flow analysis may be set to search for specific actions that may be performed by computer program 202 at compile-time, e.g., any accesses to a data location.

Static analysis module 204 may perform an analysis of computer program 202 based on the set data-flow seeds to identify any accesses to the data location by different execution units. For example, static analysis module 204 may analyze computer program 202 at compile-time and may determine that servlets A and B both make accesses to the same session object under "uprefs." Because both servlets A and B may access the same session object under "uprefs" there is a potential race condition and vulnerability in system 100 if the accesses are made in parallel.

In some embodiments, computer program 202 may be analyzed at compile time such that, for example, execution units that access any shared objects may be tracked and followed. An example data flow analysis that may be implemented by static analysis module 204 is the Z3 Satisfiability Modulo Theories (SMT) Solver created by Microsoft®.

At 308, static analysis module 204 generates a list of data-flow paths that include accesses to the data location. For example, static analysis module 204 may track the program flow of computer program 202 and any other portion of system 100 to find any accesses to the data location. Each data-flow path that accesses the data location may be added to the list of data-flow paths. At 310 Static analysis module 204 analyzes the list of data-flow paths to determine if there is more than one execution unit that may access each data location. At 312, if static analysis module 204 determines that the data location may not be accessed by more than one execution unit, no further action is required. If static analysis module 204 determines that the data location may be accessed by more than one execution unit, execution proceeds to 314 where static analysis module 204 determines whether at least one of the data-flow paths corresponding to the data location constitutes a potential vulnerability, e.g., a security vulnerability. For example, if one of the operations involved in a data-flow path that accesses the data location is a security critical operation, or the data-flow path is implemented by a security critical execution unit, static analysis module 204 may determine that the data-flow path constitutes a potential vulnerability. In some embodiments a list of security critical operations and/or execution units may be identified in advance by computer program 202 and/or otherwise provided to system 100 for use by static analysis module 204 at compile-time.

At 316, if static analysis module 204 determines that none of the data-flow paths corresponding to the data location constitutes a potential vulnerability, no further action is required. If static analysis module 204 determines that at least one of the data-flow paths corresponding to the data location constitutes a potential vulnerability, execution proceeds to 318.

At 318, schedule constraint module 206 synthesizes a scheduling constraint on the data location based on the determination that there is at least one data-flow path corresponding to the data location that constitutes a potential vulnerability. Schedule constraint module 206 is configured to generate a scheduling constraint for each data location that may be accessed by more than one execution unit or operation that was also found to constitute a potential vulnerability by static analysis module 204. In some embodiments, the scheduling constraint may include a locking mechanism that is configured to lock shared access to the data location when one of the execution units or operations is executing. For example, the scheduling constraint may lock shared access to the data location when a first execution unit having access to the data location starts execution. Once locked, only the first execution unit may access the data location. The shared access to the data location may be unlocked when the first execution unit completes execution thereby allowing other execution units to access the data location. The scheduling constraint may uniquely correspond to the data location such that every shared access to the data location is controlled by a unique scheduling constraint.

At 320, program transformation module 208 implements the synthesized scheduling constraints in the compiled program. For example, program transformation module 208 may add code corresponding to each scheduling constraint at each data location to the compiled program to allow the data location to be locked for use by a single execution unit at a time. In some embodiments, the scheduling constraints may be implemented in any other manner.

In some embodiments, the use of scheduling constraints may cause a deadlock. For example, a first execution unit may have a scheduling constraint on a first data location and a second execution unit may have a scheduling constraint on a second data location. The first execution unit may require access to the second data location to complete execution and the second execution unit may require access to the first data location to complete execution. Since each of the first and second data locations are locked by a scheduling constraint, neither of the first and second execution units may complete execution. Accordingly, the first and second execution units may be said to be deadlocked.

In some embodiments, schedule constraint module 206 may avoid deadlocks by determining and enforcing a total order on the scheduling constraints that are applied to computer program 202. In some embodiments, the total order may be arbitrary. At compile time, schedule constraint module 206 may build a call-graph representation of computer program 202 and annotate each method of computer program 202 with the schedule constraints for each data location that may require access by computer program 202. Based on the call-graph, schedule constraint module 206 or the compiler may generate for each method of computer program 202 a list of schedule constraints for each data location that may require access by the method. In some embodiments, the list of schedule constraints may also include schedule constraints for data locations that may require access by possible transitive callees of the method. For example, a transitive callee may include any sub-method, method, hardware, or other call implemented by the method itself. Finally, at run time, a method of computer program 202 may activate all of the schedule constraints for data locations that the method itself and the method's callees may require access to according to the total order determined by schedule constraint module 206. In this manner, deadlocks between conflicting execution units may be avoided. In some embodiments, the scheduling constraints may include, for example, synchronized, volatile, and/or reentrant locks. An example algorithm that may be used to introduce a scheduling constraint may be found, for example, in "Autolocker: synchronization inference for atomic sections" by Bill McCloskey et al., published in the POPL '06 Conference record of the 33rd ACM SIGPLAN-SIGACT symposium on Principles of programming languages, Pages 346-358, the entirety of which is incorporated herein by reference.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method comprising:
   receiving, by at least one processor, a computer program;
   compiling, by at least one processor, the computer program;
   at compile-time, performing, by at least one processor, data flow analysis on the computer program to identify accesses to data locations by servlets running on a server and configured for execution of a least a portion of the computer program;

generating, by at least one processor, based on the data flow analysis, a list of data-flow paths including accesses by the servlets to one or more of the data locations;

determining, by at least one processor, based on the list of data-flow paths, that a first of the servlets having a first priority and a second of the servlets having a second priority different than the first priority, access the same data location; and determining, by at least one processor, the existence of a potential vulnerability in at least one of the data-flow paths based at least in part on the determination that the first of the servlets having the first priority and the second of the servlets having the second priority different than the first priority, access the same data location.

2. The method of claim 1, further comprising:

synthesizing a scheduling constraint for the data location based at least in part on the determination of the existence of the potential vulnerability in the at least one of the data-flow paths; and implementing the scheduling constraint for the data location on the computer program.

3. The method of claim 2, wherein the scheduling constraint is configured prevent parallel access to the same data location by more than one servlet at a time.

4. The method of claim 2, wherein the scheduling constraint is a lock.

5. The method of claim 1, wherein determining that the at least one of the data-flow paths constitutes a potential vulnerability includes determining that the at least one of the data-flow paths includes a security critical servlet accessing the data location.

6. The method of claim 1, wherein implementing the scheduling constraint includes inserting code into the compiled computer program.

7. The method of claim 1, further comprising:

synthesizing a plurality of scheduling constraints for a plurality of the data locations based at least in part on determinations that data-flow paths including accesses to one or more of the plurality of the data locations constitute potential vulnerabilities;

generating a call-graph representation of the computer program;

correlating each servlet executing at least a portion of the computer program with the scheduling constraints for each data location that each servlet may require access to based at least in part on the call-graph representation; and upon execution of each servlet, activating all of the scheduling constraints that have been correlated with that servlet.

8. A system comprising:

at least one processor programmed for:

receiving, by at least one processor, a computer program;

compiling, by at least one processor, the computer program;

at compile-time, performing, by at least one processor, data flow analysis on the computer program to identify accesses to data locations by servlets running on a server and configured for execution of a least a portion of the computer program;

generating, by at least one processor, based on the data flow analysis, a list of data-flow paths including accesses by the servlets to one or more of the data locations;

determining, by at least one processor, based on the list of data-flow paths, that a first of the servlets having a first priority and a second of the servlets having a second priority different than the first priority, access the same data location; and determining, by at least one processor, the existence of a potential vulnerability in at least one of the data-flow paths based at least in part on the determination that the first of the servlets having the first priority and the second of the servlets having the second priority different than the first priority, access the same data location.

9. The system of claim 8, wherein the at least one processor is further programmed for:

synthesizing, by at least one processor, a scheduling constraint for the data location based at least in part on the determination of the existence of the potential vulnerability in the at least one of the data-flow paths; and implementing, by the at least one processor, the scheduling constraint for the data location on the computer program.

10. The system of claim 9, wherein the scheduling constraint is configured prevent parallel access to the same data location by more than one servlet at a time.

11. The system of claim 9, wherein the scheduling constraint is a lock.

12. The system of claim 8, wherein determining that the at least one of the data-flow paths constitutes a potential vulnerability includes determining that the at least one of the data-flow paths includes a security critical servlet accessing the data location.

13. The system of claim 8, wherein implementing the scheduling constraint includes inserting code into the compiled computer program.

14. The system of claim 8, wherein the at least one processor is further programmed for:

synthesizing a plurality of scheduling constraints for a plurality of the data locations based at least in part on determinations that data-flow paths including accesses to one or more of the plurality of the data locations constitute potential vulnerabilities;

generating a call-graph representation of the computer program;

correlating each servlet executing at least a portion of the computer program with the scheduling constraints for each data location that each servlet may require access to based at least in part on the call-graph representation; and upon execution of each servlet, activating all of the scheduling constraints that have been correlated with that servlet.

15. A non-transitory computer readable medium storing instructions that, when executed by at least one processor, program the at least one processor for:

receiving, by at least one processor, a computer program;

compiling, by at least one processor, the computer program;

at compile-time, performing, by at least one processor, data flow analysis on the computer program to identify accesses to data locations by servlets running on a server and configured for execution of a least a portion of the computer program;

generating, by at least one processor, based on the data flow analysis, a list of data-flow paths including accesses by the servlets to one or more of the data locations;

determining, by at least one processor, based on the list of data-flow paths, that a first of the servlets having a first priority and a second of the servlets having a second priority different than the first priority, access the same data location;

determining, by at least one processor, the existence of a potential vulnerability in at least one of the data-flow paths based at least in part on the determination that the first of the servlets having the first priority and the second of the servlets having the second priority different than the first priority, access the same data location.

16. The non-transitory computer readable medium of claim 15, wherein the instructions further program the at least one processor for:

synthesizing, by at least one processor, a scheduling constraint for the data location based at least in part on the determination of the existence of the potential vulnerability in the at least one of the data-flow paths; and implementing, by the at least one processor, the scheduling constraint for the data location on the computer program.

17. The non-transitory computer readable medium of claim 16, wherein the scheduling constraint is configured prevent parallel access to the same data location by more than one servlet at a time.

18. The non-transitory computer readable medium of claim 15, wherein determining that the at least one of the data-flow paths constitutes a potential vulnerability includes determining that the at least one of the data-flow paths includes a security critical servlet accessing the data location.

19. The non-transitory computer readable medium of claim 15, wherein implementing the scheduling constraint includes inserting code into the compiled computer program.

20. The non-transitory computer readable medium of claim 15, the instructions further program the at least one processor for:

synthesizing a plurality of scheduling constraints for a plurality of the data locations based at least in part on determinations that data-flow paths including accesses to one or more of the plurality of the data locations constitute potential vulnerabilities;

generating a call-graph representation of the computer program;

correlating each servlet executing at least a portion of the computer program with the scheduling constraints for each data location that each servlet may require access to based at least in part on the call-graph representation; and upon execution of each servlet, activating all of the scheduling constraints that have been correlated with that servlet.

* * * * *